GEORGE C. CAVANAGH
INVENTOR
HUEBNER, BEEHLER,
WORREL & HERZIG
ATTORNEYS

2,883,405

METHOD OF SEPARATING COMPONENTS OF COTTONSEED OIL BY FRACTIONAL CRYSTALLIZATION OF MISCELLA THEREOF

George C. Cavanagh, Fresno, Calif., assignor to Ranchers Cotton Oil, Fresno, Calif.

Application October 18, 1954, Serial No. 462,960

6 Claims. (Cl. 260—428.5)

The present invention relates to the physical separation of the components of oleaginous mixtures and more particularly to a method for fractionating vegetable and animal oils and fats. The invention has especially advantageous application to the winterizing of oils by the selective removal of the stearines or saturated glycerides having relatively higher freezing temperatures than the principal components of the oil and is for this reason described in connection with such use.

Most oils, if untreated, become cloudy at low temperatures so that their visual appearance and physical characteristics are impaired. This is particularly true in edible oils where such impairment is a major problem in the production of salad oils, cooking oils, mayonnaise and other oils and products containing oils. The preparation of oils to avoid these difficulties is known as the "winterization" of the oil and essentially consists of removing those portions of the oil which are subject to solidification when exposed to low temperatures, as encountered in household refrigerators, cold climates and the like. Prior to the winterization, the oils are known as "summer oils" and afterward as "winterized oils." The constituents removed are known as "stearines" and are in the form of saturated glycerides, constituting approximately 25% by weight of the initial oil in most commercially popular summer oils. It is also desirable in certain situations during the winterizing processes to remove additional undesirable constituents, such as waxes, gums, phospholipids and the like but previously known processes have not been fully successful in this respect.

The currently popular method for winterizing vegetable oils is conveniently described by reference to cotton seed oil winterization. The initial refined cotton seed oil, prior to the removal of the stearines having the relatively high freezing points, is highly viscous and solidifies at a temperature not far below 40° F. Prior to conventional winterization, it must be thoroughly cleaned and dried and is frequently bleached. Winterization tanks are employed in well insulated freezing rooms equipped with refrigeration systems. Additionally, it is common to employ brine coils in the winterization tanks themselves. The tanks are normally filled with the dry cotton seed oil at a temperature between 90° F. and 95° F. The temperatures are adjusted by whatever means is available so that a charge of oil being winterized will drop to a temperature of about 38° F. at a uniform rate over a period of approximately three days. Obviously the process is essentially a batch operation and the usual commercial batch contains approximately 40,000 pounds of cotton seed oil. The gradual and uniform temperature decrease is regarded as critical and detailed temperature charts are maintained to show hourly temperature decrease. Near the end of the three day chilling period, the temperature is observed with even greater care. As the more saturated glycerides crystallize from the oil, the release of latent heat causes the temperature of the entire mass to increase a few degrees even though the refrigeration is continued. When the released heat has been dissipated, the temperature decrease is resumed. As soon as the temperature falls below the temperature attained immediately prior to the initial crystallization of the saturated glycerides, filtration is commenced in order to remove the crystals from the oil.

The filtration is usually performed by means of plate and frame filter presses which are dressed with heavy canvas or other suitable fabric materials. The presses are also located in a refrigerated room maintained at a temperature of approximately 36° F. to 38° F. The oil containing the glyceride crystals is forced through the presses under a motivating pressure of from 15 to 20 pounds per square inch. The high stearine content soon results in the filling of the presses and the oil flow therethrough is precluded. It then becomes necessary to clean the presses by separating the leaves thereof and scraping the solidified glycerides from the press fabrics with hand scrapers. The glycerides are deposited in hoppers provided for the purpose which are equipped with heating devices so that the glycerides can be melted and pumped to storage.

Although the foregoing process is that almost universally employed for the winterizing of oils, it is subject to certain grievous difficulties which the industry has long sought to avoid.

The process is of necessity a batch operation and requires approximately three days to perform. Suitable rooms having elaborate refrigeration facilities are required. Extreme care is demanded in attaining proper temperature control and in making certain that the filtration process is initiated in a timely manner. If the refrigeration is continued for too extensive a period prior to filtration, the entire oil mass solidifies or gels and filtration is precluded. The separation of the saturated glyceride crystals from the oil is a time consuming, expensive and onerous task. The high stearine content requires frequently repeated and difficultly performed filter cleaning. During the entire process, the high viscosity of the oil makes handling difficult. In the conventional process, the cooling must be at a slow rate so that the crystals will be of a size and quality conducive to effective filtration. Inasmuch as bleaching clay is frequently employed, the oil being winterized must be thoroughly dry so that a minimum of entrainment is encountered. Since the described process is at all times conducted at temperatures above the freezing point of water, the process has no dehydrating advantage.

The required filtration has necessitated the formation of as large crystals as practical during the cooling step. The fact that crystals assume their most highly developed forms when they are grown slowly in an only slightly super-cooled solution has necessitated the extremely slow cooling described and has required in the conventional process that agitation be carefully avoided during crystal growth. The slow cooling has resulted in excessive occlusion of the oil in the stearine crystals and yields of winterized oil far less than the predictable yield determined by analysis of the summer oil prior to processing. For example, it is known that only from 8% to 12% of summer cotton seed oil need to be removed to meet the U.S.P. cold test requirements while in commercial practice from 20% to 30% of the oil is lost. In other words, the 8% to 12% of the stearines which are removed have entrained therein from approximately 12% to 22% of oil suitable for retention in the winterized oil. Similarly, while it is believed necessary to remove only from 3% to 6% of the stearine from summer cod liver oil during the winterizing thereof, such quantities of the desired oil are entrained in the stearine crystals that from 15% to 30% of the initial mass is lost. The described process is of such inaccuracy that in 1950 Alton E. Bailey in his book "Melting and Solidification of Fats" stated that "None of the commercial processes for the fractional crystallization of fats or oils effects more than a very imperfect separation of the different classes of glycerides."

The losses incident to entrainment are also encountered in other fractional crystallization processes. In fractionating the oleo oil from beef fat to produce low melting oleo oil and high melting oleostearine, the beef fat is melted and placed in vats under controlled temperature of about 95° F. After several days, solidified portions of the fat are removed from the tank. These solid portions are then wrapped with cloth and subjected to pressure to extract entrained oleo oil from the oleostearine solids. This process is generally recognized to be time consuming and inefficient but nevertheless has for many years continued to be the accepted commercial practice.

A recently developed Method of Separating the Components of a Mixture of Fats and Oils described in United States Patent No. 2,619,421 to Charles Greenfield warrants comment. Essentially the Greenfield process consists of the cooling of an oleaginous mixture, from a temperature which is not more than 15° F. higher than the temperature at which crystal nuclei are formed of the stearines, to said nuclei forming temperature at a rate of approximately 15° F. in 18 hours, further cooling the mixture to the crystallization temperature of the stearines at a fairly uniform rate of from 5° F. to 15° F. during 24 hours, and separating the crystallized components from the liquid mixture by filtration. This method also includes various heating and recooling steps which keep the oil under continuous temperature change. While the Greenfield method recognizes certain advantages to the formation of smaller crystals, than conventionally desired, in order to minimize loss by oil occlusion or entrainment in the stearines, it will be seen that the instant invention is in direct contrast to the Greenfield method in many respects. Preliminarily, it is appropriate to observe that Greenfield requires a thoroughly predehydrated oil while the instant invention not only tolerates the presence of moisture but in some instances is improved by such presence. The Greenfield method is performed in a period of time usually involving several days while the subject invention is normally performed in a few hours. The Greenfield method is primarily a batch operation while the instant invention is optionally continuous or batch. Greenfield prefers to avoid agitation during crystal formation, and to refrigerate slowly subsequent to which the temperature is raised and recooling performed. The subject invention is aided by mild agitation during one step of the operation, prefers rapid refrigeration at certain stages and at no time requires heating. Further, the two inventions, although overlapping in general purpose, possess certain dissimilar objects and advantages which they individually effectively attain.

The broad essence of the present invention will be seen to reside in the discovery of a new method for fractionating oils and fats while in miscella by the formation of crystals or amorphous solids of undesirable constituents incident to temperature reduction of the miscella.

A primary object of the present invention is, therefore, to provide an improved process for the fractional crystallization of mixtures including as major or minor components oils and/or fats.

Another object is to provide an improved winterizing process.

Another object is to make possible the continuous winterizing of oils.

Another object is to provide such a process which is suited to both batch and continuous operation.

Another object is to reduce the time required to winterize oils to a fraction of that previously needed for the purpose.

Another object is to minimize the refrigeration requirements for oil winterization.

Another object is to avoid the difficulties incident to the filtration of oils having frozen stearine crystals therein to separate resultant winterized oil from the crystals.

An object companion to that just stated is to minimize entrainment of desired oil and/or fat constituents in undesired stearines which are removed.

Another object is to provide a winterizing process in which oil and/or fats or mixtures thereof are treated while in miscella.

Another object is to avoid the requirement for thorough drying of oil prior to winterization.

Other objects are to provide a winterizing process which is conveniently, more easily, economically and efficiently performed and which is suited to simpler more economical apparatus than that required by the popular current commercial practices.

Further objects and advantages will become apparent in the subsequent description in the specification.

Figure 1:
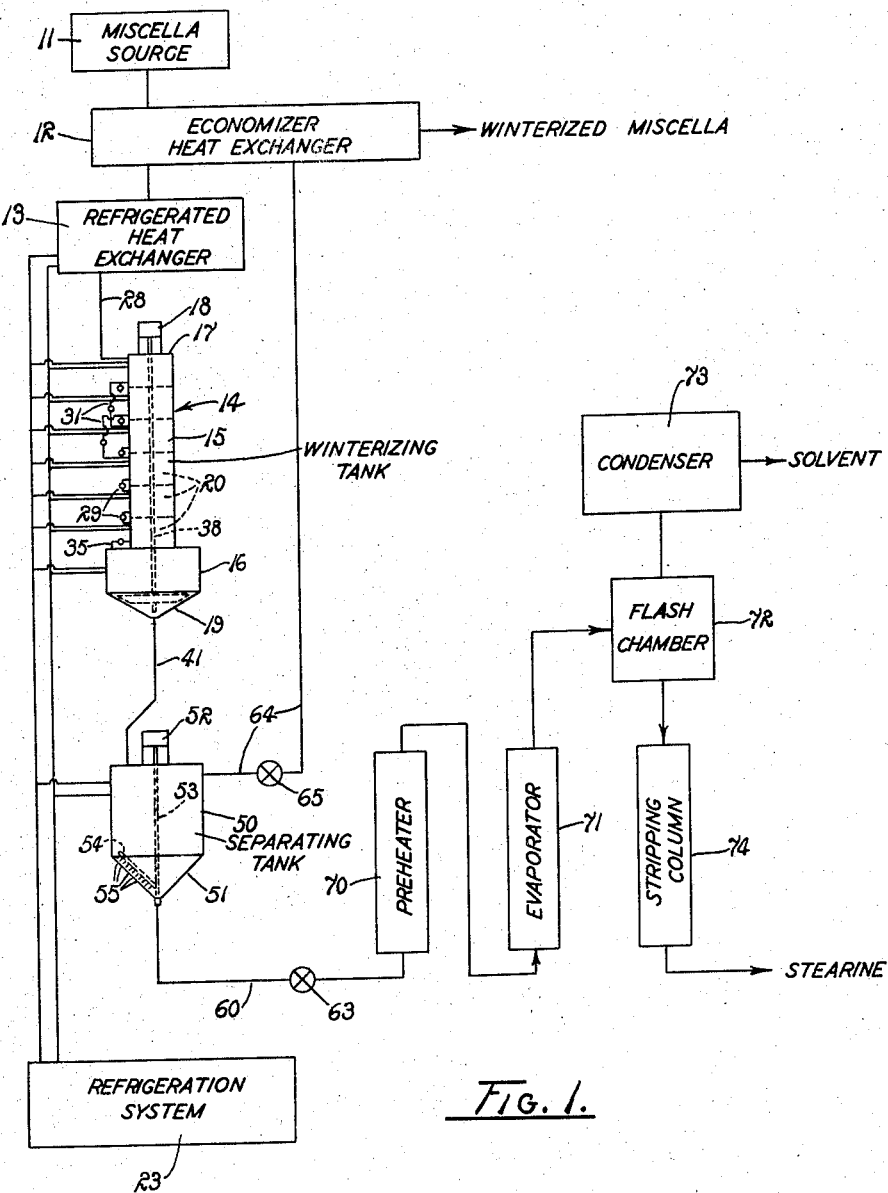
Fig. 1 is a schematic flow diagram illustrating the principles of the present invention.
Figure 2:
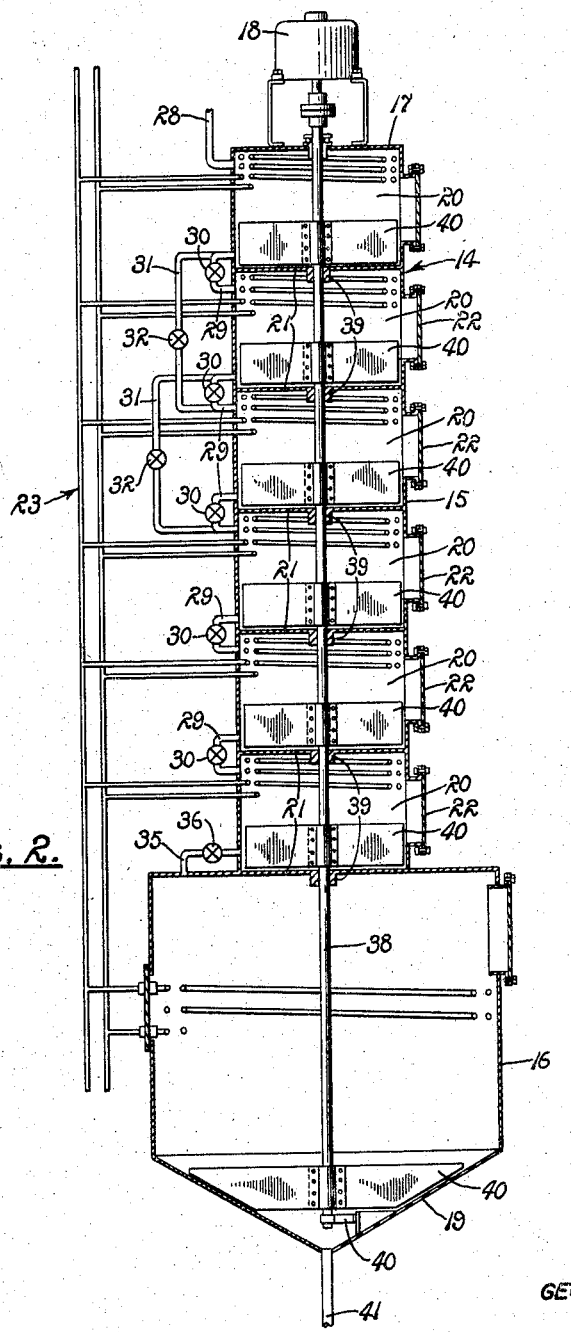
Fig. 2 is a vertical section of a refrigerated winterizing tank suitable to the practice of the present invention.
Figure 3:
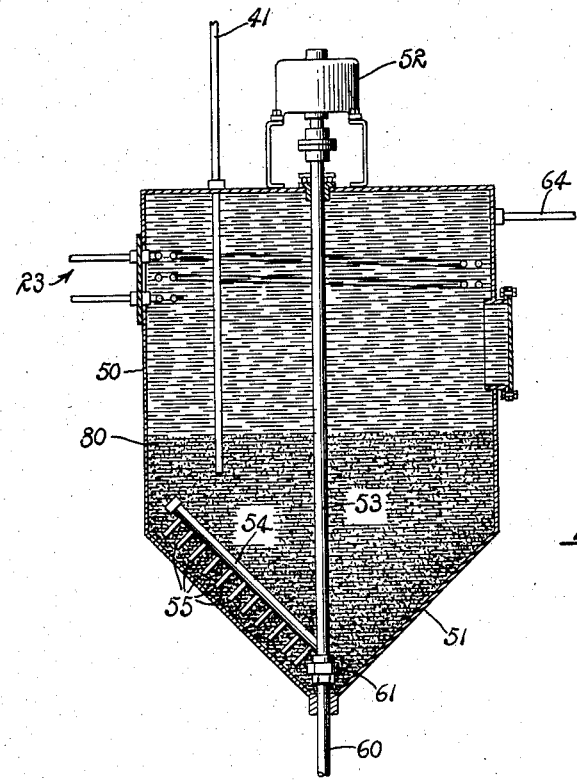
Fig. 3 is a vertical section of a separator tank shown in Fig. 1 adapted for use in the instant process.
Figure 4:
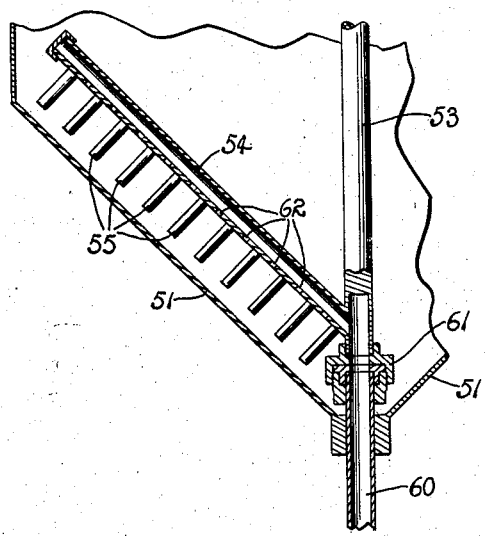
Fig. 4 is a fragmentary enlarged vertical section of the lower portion of the separator tank shown in Fig. 3.

Referring in greater particularity to the drawings:

A source of summer oil in miscella under sufficient pressure to provide desired flow rate is represented generally at 11. The miscella preferably consists of the summer oil dissolved in normal hexane or other suitable solvent, such as acetone, heptane, butane, propane, pentane, petroleum napthas, mixtures of petroleum napthas and aldehydes and/or ketones, and mixtures of petroleum napthas and alcohol. Actually hexane is preferred for economic and other considerations and the mixtures are generally the least desirable because of practical complications which result from recovery thereof for reuse. Obviously it is necessary that the solvent employed have a boiling point appreciably above the uppermost freezing temperature of the stearines or other constituents it is desired to remove and a freezing point appreciably below the lowermost freezing point of said constituents. The most efficient concentration of the oil in n. hexane from the standpoint of ease of operation and end results attained is approximately 45% oil by weight, in 55% n. hexane, although such relationship is not critical. At 0° F. the viscosity of such a miscella in which cotton seed oil makes up the oleaginous constituent is 9 pounds per foot hour at 0° F. This is in marked contrast with the viscosity of pure cotton seed oil which, for example, at the higher temperature of 38° F., the lowest temperature attained by the conventional winterizing process, is 250 pounds per foot hour. While the proportions of oil and hexane defined are preferred it will be apparent that departures may be made therefrom, as desired. For example, 30% oil in 70% hexane having a viscosity at 0° F. of 4.1 pounds per foot hour as well as 60% oil in 40% hexane having a viscosity at 0° F. of 50 pounds per foot hour have proved suited to the purpose, although each are somewhat less desirable than the preferred proportions described. The dilution of the oil with n. hexane or other solvent is found to have marked significance in the efficient and rapid separating of saturated glyceride crystals from the oil. The specific gravity of the solution is lowered thereby and the absolute viscosity decreased so that separation by settling is effective and rapid. As will be seen, this makes possible separation by decantation and the complete avoiding of filtration and the difficulties incident thereto.

It will be apparent that the miscella may be received at 11 from any suitable source thereof, illustratively from the water wash centrifuges employed in the process defined in my co-pending patent application Serial No. 366,458, filed July 7, 1953, entitled "Extraction and Refining of Glyceride Oils" or is provided simply by mixing the summer oil with the selected solvent. It is appropriate to observe, however, that in contrast with the known winterizing processes, the process of the instant invention is not so exacting in its requirement for thorough pre-drying of the oil and in fact is aided by the presence of at least minute quantities of water.

The miscella is passed through an economizer heat exchanger 12 which reduces the temperature of the miscella to approximately 38° F. from its initial temperature which is usually about 115° F. as received directly from the water wash centrifuges of a refinery. The economizer serves the purpose not only of cooling the miscella but utilizes the removed heat for subsequent warming of winterized miscella. Suitable economizer heat exchangers are well known and thus the structure thereof not described in greater detail.

The miscella is fed directly from the economizer heat exchanger 12 into a refrigerated heat exchanger 13 for purposes of reducing the temperature thereof to a first critical temperature. While for purposes of economy, the applicant prefers to use the heat exchangers 12 and 13 described, any suitable means for rapidly lowering the temperature of the miscella to a first critical level may be employed. Obviously the refrigerated heat exchanger 13 may be relied on solely to accomplish the purpose, if desired. In contrast with the conventional gradual temperature reduction over a period of three days, the subject process makes possible the rapid cooling of the miscella to the first critical temperature and this cooling is normally effected in a matter of about 30 minutes during commercial operations. A cooling rate of between 3° F. to 6° F. per minute is excellently suited to the purpose and practical to attain without excessive refrigeration requirements. More rapid or somewhat slower cooling can be performed, if desired. It should be noted that the rapid cooling is not required by the present invention but is highly desirable because of economic and other practical considerations and is for the first time now made possible.

It has been discovered that the rapid rate of refrigeration permitted by the present invention must be accurately controlled in certain critical ranges if the full advantages of the invention are to be attained. In describing these ranges, reference is first made to certain bases for their determination. It is known that the saturated glycerides present in oils and fats have a variety of freezing or crystallizing temperatures. Not only do they vary somewhat within a given type of oil but they also vary considerably between the various kinds of oils to which the method is applicable. Further, their freezing temperatures are dependent upon the amount of solvent present in miscellas of the oil being treated. Nevertheless, for all summer oils in miscellas there is always a temperature at which the stearine starts to freeze into crystals. For descriptive convenience, the highest temperature at which the stearine crystals appear in a miscella of the character described is identified as $T_c$. Further, it is known that as the temperature is decreased from $T_c$ that a second temperature is reached at which a gel is formed. This is conveniently referred to as $T_j$. For example $T_c$ for a 50% miscella of refined cotton seed oil in normal hexane is approximately 5° F. and the $T_j$ thereof approximately 0° F.

Using $T_c$ as a base, it is possible to define the temperatures at which rapid chilling of a miscella must be modified to a slow rate of chilling if maximum advantage is to be reached. For the present quite inexplicably, there are two temperature ranges at which the rate of chilling may be reduced without jeopardizing the desired results. The upper of such ranges is from 15° F. to 21° F. above the $T_c$ of the miscella in question and a second such critical range exists between 3° F. to 7° F. above said $T_c$. The explanation for the existence of the two temperature ranges in which the rapid refrigerations may be slowed, is not known. The theoretical basis is believed to be the opposing effects of decrease in activation energy incident to temperature decrease and increase in the concentration of activated or reactible molecules incident to temperature decrease. The lowering of the temperature is known to favor one factor contributing to ready crystallization but to inhibit the other factor. It is also quite possible that viscosity increase incident to temperature decrease may be of some significance. Thus, in winterizing a 50% miscella of cotton seed oil in hexane the temperature is rapidly reduced to any selected temperature, referred to as $T_s$, between 20° F. to 26° F. or between 8° F. to 12° F. Upon reaching $T_s$, the rate of cooling is reduced to a relatively slow rate. The slow rate of temperature reduction should not appreciably exceed .5° F. per minute and may be slower, if desired. The exact rate of slow temperature decrease is of necessity a compromise. Generally speaking, the slower the rate of temperature decrease the better the structure of the crystals formed. In a continuous process, however, economical considerations are of significance. As a result, it is appropriate to observe that the slow rate should not exceed .5° F. per minute or the full effect of the process will not be realized and preferably is about .2° F. This slow temperature decrease prevails from $T_s$ to any ultimate temperature $T_u$ between $T_c$ and $T_j$. During the gradual temperature reduction from $T_s$ to $T_u$, the miscella is preferably gently stirred to facilitate crystal agglomeration. After the ultimate temperature is reached, the miscella is maintained at a substantially uniform temperature for from 90 to 120 minutes as the gentle stirring is continued.

Referring again to Fig. 1, it will be understood that temperature $T_s$ is reached in the heat exchanger 13. The miscella is then conducted directly to the winterizing tank 14. The winterizing tank conveniently consists of an erect housing having an upper cylindrical portion 15 and a somewhat enlarged coaxially related lower portion 16. The upper end of the upper portion 15 is closed at 17 and mounts an electric motor 18, or other suitable source of power, externally thereon. The lower end of the lower portion 16 is closed by a funnel shaped bottom 19.

The upper portion 15 is divided into a plurality of vertically aligned compartments 20 by a plurality of partitions 21 secured transversely therein. Access for cleaning and repair purposes is gained to the compartments through removable manhole covers 22 individual thereto. The compartments are refrigerated by any suitable refrigeration system indicated generally at 23 and are of progressively colder temperatures downwardly in the tank.

A conduit 28 leads from the refrigerated heat exchanger into the top of the uppermost compartment 20. The bottom of each compartment is connected in fluid communication with the compartment therebelow by means of an external conduit 29 providing a valve 30 therein. The primary purpose of having the interconnection of the compartments 20 externally of the tank is to permit better flow control and the omission of certain of the compartments, if desired, by way of suitable by-pass conduits 31 having control valves 32 therein. The lowermost compartment 20 is connected to the lower portion 16 of the tank by a pipe 35 also preferably having a valve 36 therein.

A shaft 38 extends concentrically downwardly through the compartments and the lower portion 16 of the tank and has suitable bearing seals 39 at the various partitions. A bracket 40 is mounted in the conical bottom 19 of the tank and has the lower end of the shaft 38 journaled therein. Simple paddles 41 are mounted on the shaft in each of the compartments 20 and in the lower portion 16 of the tank. The shaft has driven connection to the motor 18 so as to be rotated at a slow rate of speed. Such rate is conveniently from 1 to 30 revolutions per minute.

Considering again the 50% miscella of cotton seed oil in n. hexane delivered to the winterizing tank 14 at temperature $T_s$, the miscella is caused to flow downwardly through successive compartments 20 so as to be subject to a decreased temperature until $T_u$ is reached in the lower portion 16, as described. This miscella enters the winterizing tank at a temperature of between 20° F to 26° F. or between 8° F. and 12° F. and is lowered to a temperature of from 0° F. to 5° F. in a period of from 90 to 120 minutes. As the miscella approaches the bottom 19 of the winterizing tank, the stearine therein commences to form crystals and the paddle 40 aids in the agglomeration of the crystals and the free passage of the miscella and stearine crystals downwardly from the tank through a conduit 41 for gravitational or other delivery to a separating tank 50. The gravitational flow is preferred so that a minimum of modification of crystal form occurs in the transfer to the separating tank. The lower end of the conduit 41 is extended downwardly within the tank for a purpose subsequently described.

As to fluid flow throughout the entire system, it obviously may be attained in any desired manner, such as by pumps, gravity alone, combinations of pumps and gravity motivation or by any other desired means. It is found to be most convenient, however, to provide an initial pressure of about 20 lbs/sq. in. on the miscella at the source 11 and to relay on such pressure for the motivation throughout the system.

Like the winterizing tank 14, the separating tank 50 similarly provides a funnel shaped lower end 51. A motor 52 is mounted on the tank and has driven connection to a shaft 53 journaled concentrically in the tank. An arm 54 is extended from the shaft in substantially parallel spaced relation to the lower end 51 and has fingers 55 extended therefrom toward the end 51. The shaft 53 is rotated by the motor 52, or any other suitable means, at a slow rate of speed, preferably at about ¼ to 1 revolution per minute. It is found that without such gentle stirring, the stearine crystals tend to form a rigid layer in the separating tank so that their controlled flow therefrom is difficult to effect.

The tank is refrigerated by the system 23 and maintained at the ultimate temperature $T_u$. The stearine crystals are drawn off from the lower end 51 of the separating tank through a conduit 60 together with sufficient quantities of solvent to make handling convenient. To minimize channeling and vortexing of the crystals in the tank 50, the inlet of the stearine conduit 60 is preferably rotated about the shaft 53. This is conveniently accomplished by providing a hollow axial bore in the lower end portion of the shaft 53 and connecting the same to the conduit 60 through a suitable union 61 located within the tank and accommodating relative rotational movement of the shaft and conduit. The arm 54 provides a hollow passage therethrough in communication with the axial bore in the shaft 53. The outer end of the passage in the arm 54 is closed and one or more downwardly disposed ports 62 provided to admit the stearine crystals. A throttling valve 63 may be employed in the conduit 60, if desired, for flow control of the stearine crystal miscella from the separating tank. A conduit 64 having a throttling valve 65 therein is connected to the upper portion of the separating tank and serves to regulate flow of winterized miscella from said tank. Such miscella is preferably passed back through the heat exchanger 12 and is warmed by heat transfer from summer miscella being delivered to the described system from the source 11. The winterized miscella after being warmed in the heat exchanger is then delivered to storage, to a deodorizer, or to an evaporator or other means, not shown, for removal of the solvent from the winterized oil. Although pumps can be employed in the positions indicated for the valves 63 and 65 for fluid motivation, this is not preferred because of resultant surges and imbalance in flow rate which results. The employment of the described pressure on the miscella at the source and the regulation of the flow rate by means of the throttling valves are excellently suited to the purpose.

The solvent and stearine crystals are conducted to a preheater 70 where the crystals are melted and thence through an evaporator 71 for separation of the major portions of the solvent present. The stearine and remaining solvent then are delivered to a flash chamber 72, in which the stearine and solvent are separated. The solvent is conducted from the flash chamber to a condenser 73 and from there goes to storage or back to the source 11 for use in forming a new miscella of summer oil. The stearine is passed through a stearine stripping column 74 and thence to storage or elsewhere as desired. The preheater, evaporator, flash chamber, condenser and stripping column are conventional apparatus employed in the normal way and are thus not described in greater detail.

*Operation*

The practice of the present invention is believed to be clearly apparent and is briefly summarized at this point. A miscella of summer oil to be treated of desired solvent-oil concentration is received by the economizer heat exchanger 12 at any desired flow rate. In a commercial form of the described system, the flow is maintained between 20 and 24 gallons per minute. When the miscella is received directly from the water wash centrifuges of a continuous oil refinery of the type constituting the subject matter of my co-pending patent application Serial No. 366,458, its initial temperature is approximately 115° F. Other sources may of course provide miscella at vastly different temperatures. Further, the miscella may consist of a wide range of oils and solvent mixtures. The solvents have previously been considered but it is appropriate to observe that cotton seed oil, peanut oil, rice oil, animal fats, and other oils requiring the separation of components by fractional crystallization are suitably employed.

The heat exchanger 12 reduces the temperature of the miscella and delivers the same to the refrigerated heat exchanger 13. Although the temperature of the miscella at this point may vary considerably, it is found in one system of the present invention to approximate 38° F. The refrigerated heat exchanger lowers the temperature of the miscella to $T_s$, the temperature, for example, selected between 20° and 26° F. or between 8° and 12° F. for 50% miscellas of cotton seed oil in n. hexane.

At temperature $T_s$, the miscella is then delivered to the winterized tank 14 where it is gently stirred and its temperature lowered over a period of from approximately 90 to approximately 120 minutes to temperature $T_u$, a temperature between 0° F. and 5° F. for the cotton seed miscella defined, at which temperature it is maintained for a period of from 90 to 120 minutes while the gentle stirring is continued.

The miscella at temperature $T_u$ then flows into the separating tank 50 at the rate of 20 to 24 gallons per minute where it is decanted into winterized miscella and stearine crystal miscella. In this manner, the separation of the stearine and winterized oil miscellas is speedily and dependably effected without the disadvantages encountered in conventional filtration. As referred to above, the presence of the solvent so reduces the viscosity of the oil and the specific gravity of the solution that the settling of the crystals for decanted separation is prompt and effective. A cleaner separation occurs in a vastly reduced period of refrigeration and the winterization of even oils previously regarded as impossible or impractical to winterize is made possible. Further the utilization of the solvent substantially reduces the freezing temperatures of the solution.

Conventional winterizing processes require thorough dehydration of the summer oils prior to treatment. All such processes involve the employment of winterizing temperatures above the freezing point of water. By working at winterizing temperatures substantially below that of water, the present invention finds minute quantities of moisture in the summer oils to be advantageous. As the temperature of the miscella in the practice of the present invention is reduced below the freezing point of water, the moisture content of the summer oil forms minute crystals in the miscella. These crystals act as nuclei for the agglomeration of subsequently formed stearine crystals thereon. It also will be seen that the lower temperatures effectively remove all moisture so that whether or not moisture content is desired to provide nuclei for the stearine crystals, its removal during winterization is effected and no separate operation for the purpose is required.

Of further aid to the prompt establishment of a two phase system in a separating tank 50 is the formation of a crystalline bed or matrix in the lower portion thereof, represented at 80. Such bed is automatically occurrent upon delivery of the miscella to the tank at temperature $T_u$. Although the gentle mixing effected by the slowly moved arm 54 and fingers 55 preclude the formation of a rigid crystalline bed, the bed exists in a flowable condition of almost filter consistency facilitating the speedy agglomeration of the stearine crystals therein. As explained before, the conduit 41 has an open lower end extended downwardly in the separating tank 50. It terminates within the flowable crystal bed 80 and delivers its stearine crystals and miscella at that point. As the lighter oil and solvent constituents move upwardly, they readily pass through the crystal bed but the stearine crystals borne thereby are actually filtered out by the bed. This function of the crystal bed greatly facilitates rapid separation of the oil-solvent miscella from the stearine crystal-solvent mixture. Of further aid is the greater weight of the stearine crystals as compared to the oil and a greater affinity of the solvent for the oil than for the crystals which aids further in gravitational separation. For example, when an initial miscella consisting of 50% cotton seed oil and 50% hexane is used, the oil-solvent fraction in the separating tank 50 is found to consist of approximately 47.5% by weight of winterized cotton seed oil and 52.5% hexane. The stearine crystal-solvent fraction consists of approximately 40% solvent and 60% stearine crystals by weight.

It is emphasized that the structure represented in the drawing is simply intended to illustrate a suitable system for practicing the present invention. Many other systems will occur to those skilled in the art. It also will be clearly apparent that various portions of the system can be combined and that the word "tank" as employed in the description of the illustrative system need not be given its normal meaning but may well encompass conduits suitable for the purpose. Further, the present invention has been described in terms of continuously winterizing summer oils. It is also obviously adaptable to batch operation.

The stearine crystals formed in the manner defined are relatively small and hard, reveal distinctly observable forms when viewed through a microscope and are found to entrain a minimum of oil. The water nuclei provided by the presence of moisture in the summer oil is believed to aid in this crystalline structure and in the minimizing of oil entrainment.

The official cold test of the American Oil Chemists Society method Cell-42 states that an oil is satisfactory if it remains clear and bright after 5½ hours of immersion in a bath of chipped ice and water. For comparison purposes, various commercially available salad and cooking oils have been tested along with oils winterized by the method of the present invention. A well known brand, A, winterized by the described conventional method requiring several days, is found to have a cold test of 18.5 hours. Another popular brand, B, winterized by the same general method has a cold test of 20.5 hours. No superior cold test results were discovered for commercial oils except for those which are chemically treated so that a residual chemical remains with the oil as a cold test aid. One such commercial oil, C, has a cold test of 45 hours and another, D, a cold test in excess of 200 hours. It is demonstrated that under conventional practices, commercial oils do not appreciably exceed cold tests of 20 hours without chemical additives. The present invention does not impart any such additive or adulterant but achieves results comparable to those previously limited to chemical treatment. For example, the cold test for cotton seed oil winterized within a period of 5 hours in 50% miscella in the manner described exceeds 100 hours. The described method not only reduces the winterizing time to a small fraction of that previously required but is found to be of improved effect in the removal of myristic, palmitic, stearic, and arachidic acids, those normally clouding summer oils at low temperatures, in removing moisture content, and by proper temperature control makes possible the removal of waxes, gums and other impurities as well as general separation of components of oleaginous mixtures having distinctive freezing temperatures.

While the invention has been illustrated and described in what is at present regarded as the most practical and preferred embodiment, it is recognized that departures may be made therefrom within the scope of the invention, which is not to be limited to the details disclosed herein but is to be accorded the full scope of the claims so as to embrace any and all equivalent methods and processes.

Having described my invention, what I claim as new and desire to secure by Letters Patent is:

1. A method of winterizing a miscella of cottonseed oil having a gelling point $T_j$ and containing stearines having a freezing point $T_c$ in a solvent for the oil having a boiling point appreciably above $T_c$ and a freezing point appreciably below $T_c$, which comprises rapidly cooling the miscella from a temperature higher than $T_c$ to a temperature $T_s$ selected from the ranges of 3° F. to 7° F. and 15° F. to 21° F. above $T_c$, further cooling the miscella at a rate less than .5° F. per minute to a temperature $T_u$ between $T_c$ and $T_j$, and maintaining the miscella at approximately $T_u$ for at least about from 90 minutes to 120 minutes while gently agitating the miscella to facilitate crystal agglomeration and to establish a two phase system consisting of winterized oil and miscella and crystallized stearine in miscella.

2. A continuous process for winterizing cottonseed oil in miscella, which oil contains stearine, comprising flowing the miscella through a first refrigerated oil conducting means at a temperature substantially below that of the miscella rapidly to lower the temperature of the miscella to a temperature in one of the ranges from 3° F. to 7° F. and from 15° F. to 21° F. above that of the freezing temperature of the stearine in the miscella, continuing to flow the miscella through a refrigerated oil conducting means while lowering the temperature of the miscella at a rate less than .5° F. per minute until stearine crystals are formed, continuing to flow the miscella through a refrigerated oil conducting means for a period of from 90 to 120 minutes while maintaining the temperature of the miscella at approximately constant level while gently agitating the miscella to facilitate stearine crystal agglomeration, and separating the miscella from the agglomerated stearine crystals.

3. A process for winterizing cottonseed oil containing stearine having a freezing temperature above the gelling temperature of the oil comprising forming a miscella of the oil in a solvent therefor of an oil concentration of from at least about 30% to 60% by weight to reduce the viscosity of the oil and to lower its specific gravity and whereby the potential freezing temperature of the stearine is lowered to a temperature $T_c$ and the potential gelling temperature of the oil is lowered to a temperature $T_j$, rapidly lowering the temperature of the miscella to $T_s$ selected from the ranges of 3° F. to 7° F. and 15° F. to 21° F. respectively, above $T_c$, continuing to lower the temperature of the miscella at a rate less than approximately .5° F. per minute to a temperature $T_u$ between $T_c$ and $T_j$, maintaining the temperature of the miscella at approximately $T_u$ for a period of from 90 to 120 minutes while gently stirring the miscella to facilitate stearine crystal agglomeration, and decanting the miscella from the stearine crystals thus agglomerated.

4. In a process for improving the low temperature characteristics of cottonseed oil having a gelling temperature of $T_j$ and containing stearine having a freezing temperature of $T_c$ which is above $T_j$, the steps comprising forming a miscella of the cottonseed oil in a solvent therefor, rapidly reducing the temperature of the miscella to a selected temperature $T_s$ not less than 3° F. above $T_c$, not more than 21° F. above $T_c$, and outside of the range of from 7° F. to 15° F. above $T_c$, and cooling the miscella at a rate less than approximately .5° F. per minute from $T_s$ to a temperature and for a period sufficient to freeze said stearine into crystals in the miscella.

5. In a process for improving the low temperature characteristics of cottonseed oil having a gelling temperature of $T_j$ and containing constituents having a crystallization temperature of $T_c$ above $T_j$ in which a miscella is formed of the cottonseed oil in a solvent therefor, the oil is cooled rapidly to a selected temperature $T_s$ above $T_c$ and subsequently relatively more slowly cooled at a rate less than approximately .5° F. per minute to a temperature and for a period sufficient to freeze said constituents into crystals, the steps of reducing the temperature in the range of from 15° F. to 7° F. above $T_c$ and in the range from 3° F. to 0° F. above $T_c$ at substantially constant rates within each range.

6. A continuous process for winterizing cottonseed oil containing stearine which it is desired to remove from the oil comprising forming a 50% miscella of the oil in normal hexane to reduce the viscosity of the oil and to lower the specific gravity thereof, rapidly cooling the miscella at a rate in excess of 1° F. per minute to a first critical temperature between about 8° F. to about 12° F., continuing to cool the miscella at a slow rate of approximately .2° F. per minute to a second critical temperature between about 0° F. and about 5° F., maintaining the miscella at approximately said second critical temperature for a period sufficient for the stearine to form crystals and settle in the miscella, decanting the miscella from the settled crystals, and stripping the solvent from the oil in the decanted miscella.

References Cited in the file of this patent

UNITED STATES PATENTS

| | | |
|---|---|---|
| 2,012,106 | Mauersberger | Aug. 20, 1935 |
| 2,205,381 | Eckey et al. | June 25, 1940 |
| 2,352,883 | Bolley | July 4, 1944 |
| 2,425,001 | Parkin et al. | Aug. 5, 1947 |
| 2,450,235 | Gee | Sept. 28, 1948 |
| 2,678,937 | Brennan et al. | May 18, 1954 |